Feb. 5, 1924. 1,482,493
E. W. WEAVER
FUEL SYSTEM FOR MOTOR VEHICLES
Filed Sept. 19, 1921
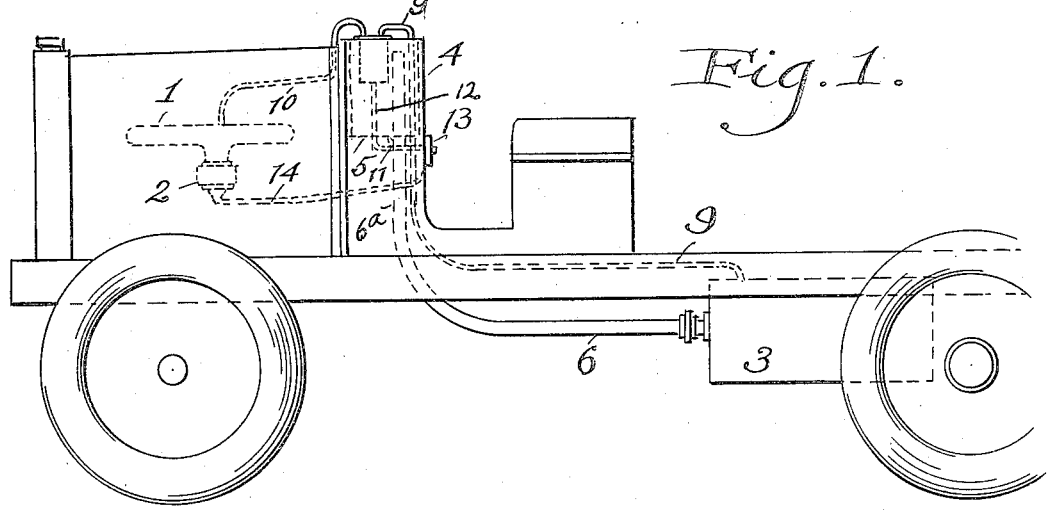
Fig. 1.
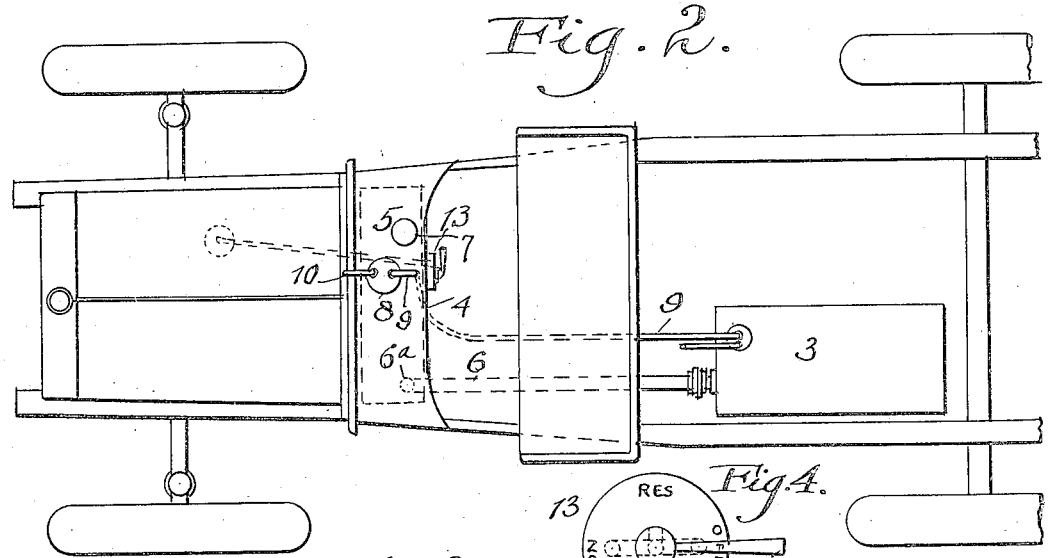
Fig. 2.
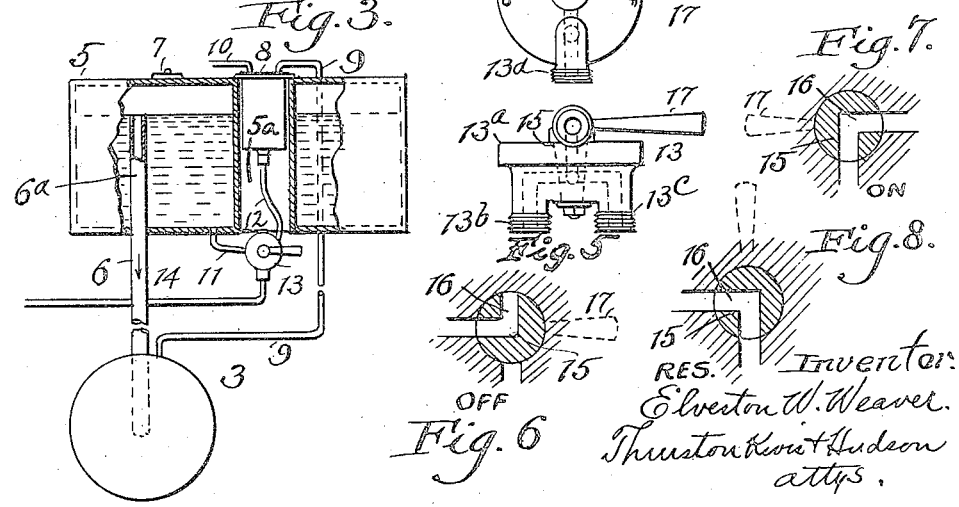
Inventor:
Elveston W. Weaver.
Thurston Kwis & Hudson
attys.

Patented Feb. 5, 1924.

1,482,493

UNITED STATES PATENT OFFICE.

ELVERTON W. WEAVER, OF CLEVELAND, OHIO.

FUEL SYSTEM FOR MOTOR VEHICLES.

Application filed September 19, 1921. Serial No. 501,512.

*To all whom it may concern:*

Be it known that I, ELVERTON W. WEAVER, a citizen of the United States, residing at Cleveland, in the county of Cuyahoga and State of Ohio, have invented a certain new and useful Improvement in Fuel Systems for Motor Vehicles, of which the following is a full, clear, and exact description.

The present invention relates to a liquid fuel storage and distributing system which is particularly adapted for use with a motor vehicle.

One of the objects of the invention is to provide an auxiliary supply of fuel in addition to the main supply so that when the main supply of fuel is exhausted there remains the auxiliary supply which may serve to run the vehicle until the main supply is replenished.

Another object is to so locate the receptacle containing the auxiliary supply of fuel that the same may be fed by gravity to the carbureter of the engine.

A further object is to so relate the receptacle or tank for the auxiliary supply of fuel with respect to the tank for the main supply that the filling operation replenishes and fills to the desired degree, the auxiliary receptacle or tank and the surplus passes on to the main tank.

A further object is to provide a range of the auxiliary fuel tank and the usual vacuum tank of its equivalent, together with a suitable valve to control the source of delivery of fuel to the carbureter of the engine.

Referring to the accompanying drawings which form a part of this specification, Fig. 1 is a somewhat diagrammatic elevation of a portion of a motor vehicle showing the application of the present invention; Fig. 2 is a top plan view of the showing in Fig. 1; Fig. 3 is an elevation with portions in section diagrammatically representing the relation of the various elements making up the present invention; Fig. 4 is a top plan view of a three-way valve; Fig. 5 is a side elevation of the showing in Fig. 4; Figs. 6, 7 and 8 are sections somewhat diagrammatically representing various positions of the three-way valve.

In the drawings, 1 may represent the manifold of an engine, 2 diagrammatically represents the carbureter for an engine by which the motor vehicle on which it is mounted is propelled.

Located at some convenient position with respect to the chassis is a tank 3 which may be denominated the main fuel supply tank; this tank is of suitable size and capacity. Located preferably just in front of the dash board 4 of the vehicle is a tank represented at 5 which may be denominated the auxiliary fuel tank. There is a pipe or conduit 6 which communicates with the main fuel tank 3 and extends into the auxiliary fuel tank 5, and the portion of the pipe 6, indicated at 6ª, which extends into the auxiliary fuel tank 5, is of a predetermined height for the purpose which will be presently described.

The auxiliary fuel tank 5 is provided with a filling opening 7 and this filling opening 7 serves as the filling opening through which fuel is replenished through the entire fuel feeding system. When fuel is introduced through the opening 7, the auxiliary fuel tank 5 will first receive the fuel and as it becomes filled, the fuel will overflow into the portion 6ª of the pipe 6 and so pass through the pipe 6 to the main fuel tank 3, therefore it will be apparent that there will always be fuel in the auxiliary tank 5 when there is fuel in the main tank 3 and in supplying liquid fuel to the system the arrangement is such that there is certainty that the auxiliary tank will be filled with fuel.

The main fuel tank 3 communicates with a so called vacuum tank which is represented at 8, by means of a pipe 9. The tank 8 is not represented in detail as the particular construction of the tank forms no part of the present invention. This tank may be the usual so called vacuum tank or it may be any other form of tank which when the engine is in operation serves to cause liquid fuel to pass from the main fuel tank 3 to the tank 8. In the present instance the tank 8 may be considered a vacuum tank and this tank is connected by means of a pipe 10 with the manifold of the engine, following construction which is well known in the art.

The auxiliary fuel tank 5 is located on the vehicle above the main storage tank 3 and is so positioned with respect to the carbureter of the engine, that under certain circumstances which will be later described the fuel in the auxiliary tank 5 may be supplied to the carbureter by gravity.

The vacuum tank 8 is also located so as to be above the carbureter of the engine whereby fuel which passes from the main fuel tank to the vacuum tank 8 may flow from the tank 8 to the carbureter by gravity. This arrangement of the vacuum tank is in accordance with well known practice.

While it is not essential so far as this invention is concerned that the auxiliary fuel tank and the vacuum tank be directly associated with each other, it is very convenient to have such an arrangement and for the purpose the auxiliary fuel tank 5 is shown as provided with a walled opening extending through the same as indicated at 5ª and occupying at least a portion of this walled opening is the vacuum tank 8. This arrangement brings the auxiliary fuel tank 5 and the vacuum tank into close relationship so far as position is concerned and requires shorter lengths of pipe for connecting these various tanks with the three-way valve which is about to be described and with the carbureter.

Communicating with the lower portion of the auxiliary tank 5 is a pipe 11 and communicating with the lower portion of the suction tank 8 is a pipe 12. Both of these pipes communicate with the three-way valve which is generally indicated at 13 and there is also communicating with the casing of the three-way valve a pipe 14 which connects with the carbureter of the engine in a manner which is well known in the art.

The three-way valve comprises a casing 13ª and is also provided with a threaded nipple 13ᵇ which connects with the pipe 11 and another threaded nipple 13ᶜ which connects with the pipe 12. There is also a third threaded nipple 13ᵈ which connects with the pipe 14.

The body of the valve has suitable conduits communicating with the conduits which extend to and through the nipple 13ᵇ, 13ᶜ and 13ᵈ.

There is a central opening through the valve which is occupied by a plug 15, which plug has a right angled opening in it as indicated at 16 and also the plug is provided with a handle 17 by which it is manipulated.

In Fig. 6 the plug 15 is in its off position.

In Fig. 7 the plug is in position to connect the pipe 14 with the pipe 12 so that the supply of fuel which passes to the carbureter, comes from the main fuel tank 3 to the suction tank 8 and thence to the carbureter.

When this source of fuel supply becomes exhausted and it is not immediately possible or convenient to replenish the supply, the valve may be turned until the plug 15 occupies a position shown in Fig. 8, in which position the pipes 11 and 14 are in communication so that the fuel within the tank 5 may by gravity pass to the carbureter, thus making available the fuel which is contained within the auxiliary tank.

As before pointed out, when the system is replenished with fluid fuel it must be done through the filling opening 7 to the auxiliary tank 5 so that what ever liquid fuel may have been withdrawn from the auxiliary tank 5 will be replenished before the main tank 3 receives its supply.

For convenience of operation, the three-way valve 13 may be placed on the dash of the vehicle, thus making it unnecessary for the driver to dismount when it become necessary to use the liquid fuel of the auxiliary supply.

As before pointed out, the auxiliary tank 5 is so located as to be above the carbureter 2 so that the liquid fuel which may be fed therefrom to the carbureter, feeds by gravity and is not depending upon the vacuum tank, or the equivalent thereof, in order to supply fuel to the carbureter. This arrangement is purposeful for two reasons. First, it enables the particular arrangement as to filling so as to insure that the auxiliary tank is always filled to the proper level before the main tank is filled, and secondly, if for any reason the suction or vacuum tank fails to function, the auxiliary supply of fuel may be utilized to run the engine, which could not be the case if the supply of auxiliary fuel were dependent upon the operation and functioning of the vacuum or suction tank.

Having described my invention, I claim—

1. A liquid fuel system for use with the carbureter of an internal combustion engine comprising a main fuel storage tank, an auxiliary fuel storage tank located above the main storage tank and above the carbureter with which the system is used, means including a suction tank independent of the auxiliary tank for delivering fuel from the main tank to the carbureter, a pipe connecting the main fuel tank with the suction tank, a pipe connected with the carbureter, said carbureter pipe being adapted for connection with the suction tank and with the auxiliary fuel tank or valve means connecting the carbureter pipe with either the suction tank or auxiliary fuel tank.

2. A liquid fuel system for use with the carbureter of an internal combustion engine comprising a main fuel storage tank, an auxiliary fuel storage tank located above the main storage tank and above the carbureter with which the system is used, said auxiliary tank having a filling opening, a suction tank independent of the auxiliary tank, a pipe connecting the main fuel tank with the suction tank, a filling pipe connecting the auxiliary fuel tank with the main storage tank, a pipe connected with the carbureter, a valve casing with which the carbureter pipe communicates, a pipe connecting said valve casing with the suction tank, a pipe connecting said valve casing with the auxiliary tank and a valve in said valve casing for controlling the connection of the carbureter pipe with either of the other of said pipes.

3. A liquid fuel system for use with the carbureter of an internal combustion engine comprising a main fuel storage tank, an auxiliary fuel storage tank located above the main storage tank and above the carbureter with which the system is used, a suction tank, a pipe connecting the main fuel tank with the suction tank, a pipe connected with the carbureter, said carbureter pipe being adapted for connection with the suction tank and with the auxiliary fuel tank and valve means controlling the said connection of the carbureter pipe, a filling pipe communicating with the main storage tank, said pipe extending into the auxiliary fuel tank and forming a stand-pipe therein.

4. The combination with a motor vehicle having an internal combustion engine and a carbureter therefor, of a liquid fuel system comprising a main storage tank supported by the chassis of the vehicle, an auxiliary storage tank located adjacent the dash board of the vehicle, said tank having a filling opening, a pipe connecting the upper portion of said auxiliary tank with the storage tank, a suction tank, a pipe connecting the suction tank with the main storage tank, a pipe connected with the carbureter of the engine, a three-way valve with which the said carbureter pipe communicates, said valve being located on the dashboard of the vehicle, separate pipes connecting the suction tank and the auxiliary fuel tank respectively with the said three-way valve, whereby the supply of fuel to the carbureter may be controlled.

In testimony whereof, I hereunto affix my signature.

ELVERTON W. WEAVER.